(12) United States Patent
Oh

(10) Patent No.: US 8,004,821 B2
(45) Date of Patent: Aug. 23, 2011

(54) METAL CAPACITOR AND MANUFACTURING METHOD THEREOF

(76) Inventor: Young Joo Oh, Seoul (KR)

( * ) Notice: Subject to any disclaimer, the term of this patent is extended or adjusted under 35 U.S.C. 154(b) by 766 days.

(21) Appl. No.: 12/010,328

(22) Filed: Jan. 24, 2008

(65) Prior Publication Data

US 2008/0285210 A1  Nov. 20, 2008

(30) Foreign Application Priority Data

Feb. 6, 2007  (KR) .................. 10-2007-0012342

(51) Int. Cl.
*H01G 4/06* (2006.01)
(52) U.S. Cl. ............... 361/311; 361/313; 361/321.1; 361/321.2; 361/301.4; 361/306.1
(58) Field of Classification Search .............. 361/311, 361/312–313, 303–305, 301.4, 321.1, 321.2, 361/306.1, 301.2

See application file for complete search history.

(56) References Cited

U.S. PATENT DOCUMENTS

| 5,745,336 | A | * | 4/1998 | Saito et al. | 361/321.5 |
| 5,926,359 | A | * | 7/1999 | Greco et al. | 361/311 |
| 6,081,417 | A | * | 6/2000 | Matsuki | 361/311 |
| 6,166,899 | A |   | 12/2000 | Tamamitsu | |
| 6,215,646 | B1 | * | 4/2001 | Ochiai et al. | 361/301.4 |
| 6,462,931 | B1 | * | 10/2002 | Tang et al. | 361/305 |
| 7,400,008 | B2 | * | 7/2008 | Horii | 257/309 |

* cited by examiner

*Primary Examiner* — Nguyen T Ha
(74) *Attorney, Agent, or Firm* — Rosenberg, Klein & Lee

(57) ABSTRACT

A metal capacitor in which an electric conductivity is significantly improved by applying a metal material, instead of a solid electrolyte and electrolyte of an aluminum electrolytic capacitor, and a manufacturing method thereof is provided. A metal capacitor 10 includes a metal member 11 including a plurality of grooves 11*a* on both surfaces of the metal member 11, a metal oxide film 12 being formed on the metal member 11, a seed electrode layer 13 being formed on the metal oxide film 12, a main electrode layer 14 being formed on the metal oxide film 12 to fill the plurality of grooves 11*a*, a plurality of lead terminals 15 being installed in the main electrode layer 14, and a molding member 16 being disposed so that the plurality of lead terminals may be externally protruded from the molding member 16, and the metal member 11, the metal oxide film 12, the seed electrode layer 13, and the main electrode layer 14 may be sealed.

1 Claim, 4 Drawing Sheets

METAL CAPACITOR AND MANUFACTURING METHOD THEREOF

BACKGROUND

1. Field

The present invention relates to a metal capacitor in which an electric conductivity is significantly improved by applying a metal material, instead of a solid electrolyte and electrolyte of an aluminum electrolytic capacitor, and a manufacturing method thereof.

2. Background

An aluminum electrolytic capacitor is used to smooth a power output from a power circuit to be a predetermined value, or is used as a low frequency bypass. Hereinafter, a method of manufacturing the aluminum electrolytic capacitor will be briefly described.

An etching process of etching the surface of an aluminum foil is performed to enlarge a surface area of the aluminum foil and thereby increase an electric capacity. When the etching process is completed, a forming process of forming a dielectric substance on the aluminum foil is performed. When cathode and anode aluminum foils are manufactured through the etching process and the forming process, a slitting process of cutting the manufactured aluminum foil and a separator by as long as a desired width based on the length of a product is performed. When the slitting process is completed, a stitching process of stitching an aluminum lead patch, which is a lead terminal, to the aluminum foil is performed.

When the slitting of the aluminum foil and the separator is completed, a winding process of disposing the separator between the anode aluminum foil and the cathode aluminum foil, and then winding the separator and the aluminum foils in a cylindrical shape and attaching a tape thereto, so as to not be unwounded. When the winding process is completed, an impregnation process of inserting the wound device into an aluminum case and injecting an electrolyte is performed. When the injecting of the electrolyte is completed, a curing process of sealing the aluminum case using a sealing material is performed. When the curling process is completed, an aging process of restoring a damage to the dielectric substance is performed. Through this, the assembly of the aluminum electrolytic capacitor is completed.

Due to the current development in digitalization and thinness of electronic devices, when applying the conventional aluminum electrolytic capacitor, there are some problems as follow.

Since the aluminum electrolytic capacitor uses the electrolyte, an electric conductive is comparatively low and thus a lifespan of the aluminum electrolytic capacitor is reduced in a high frequency area. Also, there are some constraints on improvement of reliability, a high frequency response, a low equivalent series resistance (ESR), and impedance. Also, due to a comparatively high ripple pyrexia, there are some constraints on stability and environments, such as fuming and firing.

SUMMARY OF THE INVENTION

The present invention is conceived to solve the above-described problems and thus provides a metal capacitor in which an electric conductivity is improved by about 10,000 to 1,000,000 folds by applying a metal material for an electrolyte, in comparison to when using a conventional electrolyte or an organic semiconductor, a multi-layer metal capacitor using the metal capacitor, and a manufacturing method thereof.

The present invention also provides a metal capacitor which can improve a thinness, a low equivalent series resistance (ESR), a reduction in a ripple pyrexia, a long life, a heat-resistant stability, non-fuming, non-firing, and environment by using a metal material for an electrolyte, a multi-layer metal capacitor using the metal capacitor, and a manufacturing method thereof.

The present invention also provides a metal capacitor which can be simply provided in a multi-layer by using a metal material for an electrolyte, which is impossible in a conventional aluminum electrolytic capacitor structure, a multi-layer metal capacitor using the metal capacitor, and a manufacturing method thereof. According to an aspect of the present invention, there is provided a metal capacitor including: a metal member including a plurality of grooves on each of both surfaces of the metal member; a metal oxide film being formed on the metal member; a seed electrode layer being formed on the metal oxide film, and a main electrode layer being formed on the seed electrode layer to fill the plurality of grooves; a plurality of lead terminals being installed in the main electrode layer; and a molding member being disposed so that the plurality of lead terminals is externally protruded from the molding member, and the metal member, the metal oxide film, the seed electrode layer, and the main electrode layer are sealed.

According to another aspect of the present invention, there is provided a method of manufacturing a metal capacitor, the method including: an etching process of arranging a plurality of grooves on both surfaces of a metal member using a direct current (DC) etching; a forming process of forming a metal oxide film on the metal member using an anodizing ways when the plurality of grooves is formed on the metal member; a process of forming a seed electrode layer to be penetrated into the metal oxide film using an electroless plating, when the metal oxide film is formed; a process of forming a main electrode layer to fill the plurality of grooves formed on the metal member via the seed electrode layer as a medium and using the electroless plating or an electroplating, when the electrode seed layer is formed; a process of connecting a lead terminal on the main electrode layer when the main electrode layer is formed; and a molding process of sealing the metal member so that the lead terminal is externally protruded when the lead terminal is connected.

BRIEF DESCRIPTION OF THE DRAWINGS

The embodiments will be described in detail with reference to the following drawings in which like reference numerals refer to like elements wherein.

DETAILED DESCRIPTION

First Embodiment

Hereinafter, the first embodiment of the present invention will be described with reference to FIG. 1.

Figure 1:
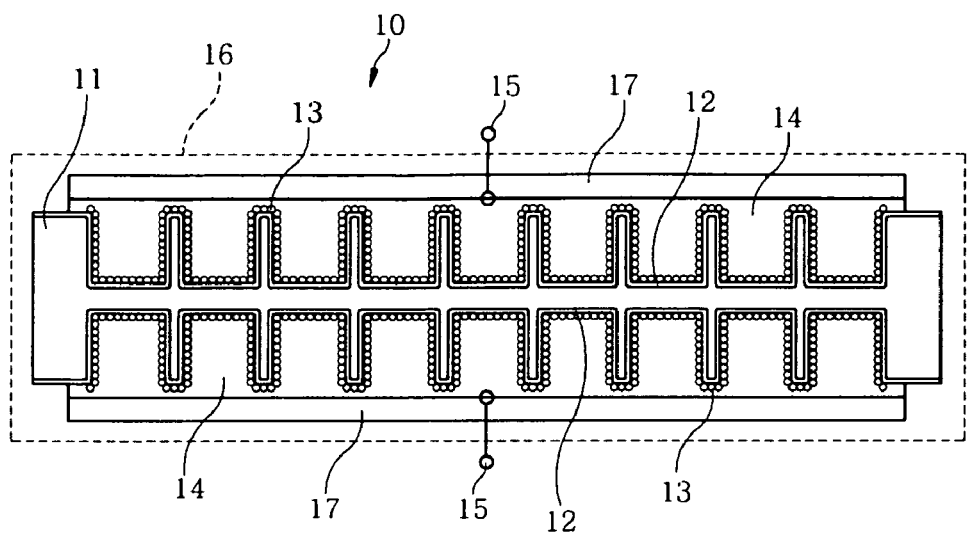
FIG. 1 is a cross-sectional view illustrating a metal capacitor according to a first embodiment of the present invention.

FIG. 1 is a cross-sectional view illustrating a metal capacitor 10 according to the first embodiment of the present invention.

As shown in FIG. 1, the metal capacitor 10 includes a metal member 11 including a plurality of grooves 11a on each of both surfaces of the metal member 11, a metal oxide film 12 being formed on the metal member 11, a seed electrode layer 13 being formed on the metal oxide film 12, and a main electrode layer 14 being formed on the seed electrode layer 13 to fill the plurality of grooves 11a, a plurality of lead terminals 15 being installed in the main electrode layer 14, and a molding member 16 being disposed so that the plurality of lead terminals 15 may be externally protruded from the molding member 16, and the metal member 11, the metal oxide film 12, the seed electrode layer 13, and the main electrode layer 14 may be sealed.

Hereinafter, a configuration of the metal capacitor 10 will be further described in detail.

As shown in FIG. 1, the metal capacitor 10 includes the metal member 11, the metal oxide film 12, the seed electrode layer 13, the main electrode layer 14, the plurality of lead terminals 15, and the molding member 16. Configurations thereof will be sequentially described.

The metal member 11 is formed in either a foil or a planar shape. The plurality of grooves 11a is arranged on both surfaces of the metal member 11 in order to increase a surface area. In this instance, a material of the metal member 11 that includes the plurality of grooves 11a uses any one of aluminum (Al), niobium (Nb), tantalum (Ta), zirconium (Zr), and titanium (Ti).

The metal oxide film 12 is formed on the metal member 11. A material of the metal oxide film 12 uses any one of alumina ($Al_2O_3$), oxide niobium ($Nb_2O_5$), oxide tantalum ($Ta_2O_5$), oxide zirconium ($ZrO_2$), and oxide titanium ($TiO_2$), depending on the material that the metal member 11 uses among Al, Nb, Ta, Zr, and Ti. The seed electrode layer 13 corresponds to a portion where small cylindrical shapes are arranged, as shown in FIG. 1, and is formed on the metal oxide film 12. The seed electrode layer 13 is formed when the main electrode layer 14 cannot be filled in the plurality of grooves 11a formed on the metal member 11. The seed electrode layer 12 uses any one of aluminum (Al), copper (Cu), zinc (Zn), silver (Ag), gold (Au), nickel (Ni), tin (Sn), palladium (Pd), platinum (Pt), cobalt (Co), and indium (In) to be penetrated into the metal oxide film 12.

The main electrode layer 14 is formed on the seed electrode layer 13 to fill the plurality of grooves 11a, and uses any one of Al, Cu, Zn, Ag, Au, Ni, Sn, Pd, Pt, Co, and In. A plurality of main electrode layers 14 is provided. Therefore, as shown in FIG. 1, the plurality of main electrode layers 14 may be formed on each of the seed electrode layers 13 formed on both surfaces of the metal member 11, respectively. Also, a conductive adhesive layer 17 may be further provided. In this instance, the conductive adhesive layer 17 is formed using a solder paste, an electroless plating ways, or an electroplating ways. The conductive adhesive layer 17 is provided to improve an adhesive strength and an adhering process. The plurality of lead terminals 15 is installed in the main electrode layer 14. In FIG. 1, the plurality of lead terminals 15 is installed in the conductive adhesive layer 17. However, when the conductive adhesive layer 17 is not provided, the plurality of lead terminals 15 is installed in the main electrode layer 14 with a mechanical force using a high pressure.

The molding member 16 uses epoxy molding compound (EMC). In this instance, when the plurality of lead terminals 15 is installed in either the main electrode layer 14 or the conductive adhesive layer 17, the molding member 16 is provided to seal the metal member 11, the metal oxide film 12, the seed electrode layer 13, and the main electrode layer 14 in the state where the plurality of lead terminals 15 is externally protruded. Also, the molding member 16 may be molded in a planar shape as shown in FIG. 1. Also, the molding member 16 may be molded in a cylindrical shape (not shown). When the molding member 16 is molded in the cylindrical shape, the metal member 11 is molded in a wound state like the conventional aluminum capacitor.

Second Embodiment

Hereinafter, the second embodiment of the present invention will be described with reference to FIG. 2.

Figure 2:
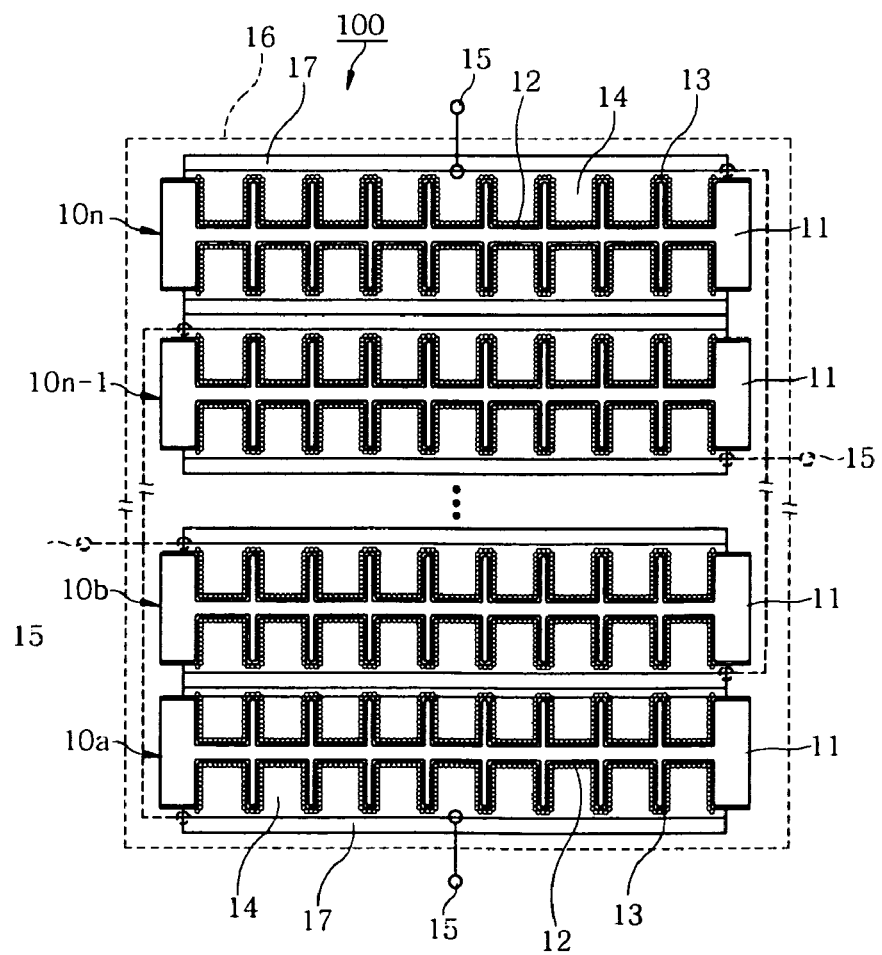
FIG. 2 is a cross-sectional view illustrating a multi-layer metal capacitor according to a second embodiment of the present invention.

FIG. 2 is a cross-sectional view illustrating a multi-layer metal capacitor 100 according to the second embodiment of the present invention.

As shown in FIG. 2, the multi-layer metal capacitor 100 includes: a plurality of first to $n^{th}$ metal capacitance members 10a, 10b, ... , 10n, wherein each of the metal capacitance members 10a, 10b, ... , 10n includes; a metal member 11 including a plurality of grooves 11a on both surfaces of the metal member 11; a metal oxide film 12 being formed on the metal member 11; a seed electrode layer 13 being formed on the metal oxide film 12; and a main electrode layer 14 being formed on the seed electrode layer 13 to fill the plurality of grooves 11a; a plurality of lead terminals 15 being installed in each of the main electrode layers 14 of the first metal capacitance member 10a and the $n^{th}$ metal capacitance member 10n among the plurality of first to the $n^{th}$ metal capacitance members 10a, 10b, ... , 10n; and a molding member 16 being provided so that the plurality of lead terminals 15 is externally protruded and the first to $n^{th}$ metal capacitance members 10a, 10b, ... , 10n, are sealed.

Hereinafter, a configuration of the multi-layer metal capacitor 100 will be further described in detail.

As shown in FIG. 2, the multi-layer metal capacitor 100 includes the plurality of first to $n^{th}$ metal capacitance members 10a, 10b, ... , 10n, the plurality of lead terminals 15, and the molding member 16. Hereinafter, configurations thereof will be sequentially described.

Each of the first to $n^{th}$ metal capacitance members 10a, 10b, ... , 10n includes the metal member 11, the metal oxide film 12, the seed electrode layer 13, and the main electrode layer 14. The configuration thereof is the same as the configuration of the metal capacitor 10 according to the first embodiment and thus will be briefly described.

The plurality of grooves 11a is arranged on both surfaces of the metal member 11. The metal oxide film 12 is formed on the plurality of grooves 11a that is arranged on the metal member 11. The main electrode layer 14 is formed on the seed electrode layer 13 to fill the plurality of grooves 11a. The main electrode layer 14 further includes a conductive adhesive layer 17. In this instance, the conductive adhesive layer 17 is provided to more readily multi-lay the plurality of first to $n^{th}$ metal capacitance members 10a, 10b, ... , 10n, or to improve the adhesiveness when installing the plurality of lead terminals 15.

As shown in FIG. 2, the plurality of lead terminals 15 may be provided in a different form depending on when the multi-layer metal capacitor 100 is formed in a serial multi-layer type to use for a high-voltage and a low capacity, or when the multi-layer metal capacitor 100 is formed in a parallel multi-layer type to use for a low-voltage and a large capacity.

When the multi-layer metal capacitor 100 is formed in the serial multi-layer type to use for the high-voltage and the low capacity, the plurality of lead terminals 15 is provided as indicated by solid lines of FIG. 2. Specifically, the plurality of lead terminals 15 is connected to the main electrodes 14 that are located in an outer portion of the first metal capacitance member 10a and $n^{th}$ metal capacitance member 10n among the plurality of first to $n^{th}$ metal capacitance members 10a, 10b, ..., 10n.

When the multi-layer metal capacitor 100 is formed in the parallel multi-layer type to use for the low-voltage and the large capacity, the plurality of lead terminals 15 is provided as indicated by dotted lines of FIG. 2. Specifically, one of the plurality of lead terminals 15 is connected to the main electrode layers 14 of odd $number^{th}$ metal capacitance members 10a, ..., 10n-1, and another lead terminal 15 is connected to the main electrode layers 14 of even $number^{th}$ metal capacitance members 10b, ..., 10n among the plurality of first to $n^{th}$ metal capacitance members 10a, 10b, ..., 10n.

When the plurality of lead terminals 15 is installed in the plurality of first to $n^{th}$ metal capacitance members 10a, 10b, ..., 10n, the molding member 16 is provided. The molding member 16 is provided so that the plurality of lead terminals may be externally protruded from the molding member 16 and the plurality of first to $n^{th}$ metal capacitance members 10a, 10b, ..., 10n may be sealed. When sealing the plurality of first to $n^{th}$ metal capacitance members 10a, 10b, ..., 10n, the molding member 16 molds the first to $n^{th}$ metal capacitance members 10a, 10b, ..., 10n in either a planar shape as shown in FIG. 2 or a cylindrical type (not shown). When molding the first to $n^{th}$ metal capacitance members 10a, 10b, ..., 10n in the cylindrical shape, the molding member 16 winds and molds the plurality of first to $n^{th}$ metal capacitance members 10a, 10b, ..., 10n.

Hereinafter, a method of manufacturing the metal capacitor 10 according to the first embodiment and the multi-layer metal capacitor 100 according to the second embodiment of the present invention, constructed as described above, will be described with reference to the accompanying drawings.

Firstly, a method of manufacturing the metal capacitor 10 according to the present invention will be described with reference to FIGS. 3A through 3F.

Figure 3A:
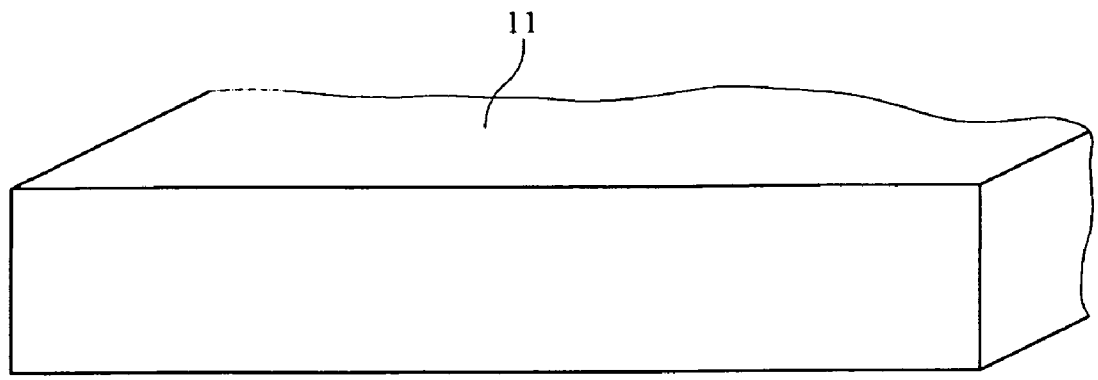
FIGS. 3A through 3G are cross-sectional views illustrating a method of manufacturing a metal capacitor and a multi-layer metal capacitor according to the present invention.
Figure 3B:
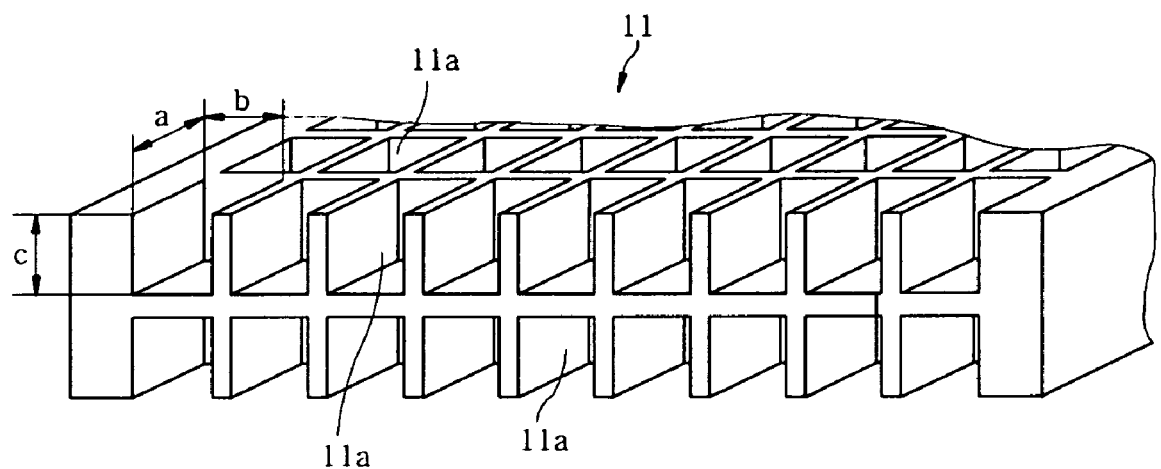

As shown in FIGS. 3A and 3B, an etching process of forming a plurality grooves 11a on both surfaces of a metal member 11 using an electrochemical method, that is, a direct current (DC) etching method is performed to increase a surface area of the metal foil 11. When forming the plurality of grooves 11a shown in FIG. 3B, the width a and b of each groove 11a is about 0.1 µm to about 5 µm. Also, the height c of each groove 11a is about 10 µm to about 100 µm. The width of each groove 11a may be formed to be, preferably about 1 µm, and the height c thereof may be formed to be, preferably, about 40 µm When the plurality of grooves 11a is formed on the metal member 11, a forming process of forming the metal oxide film 12 that uses any one of alumina ($Al_2O_3$), oxide niobium ($Nb_2O_5$), oxide tantalum ($Ta_2O_5$), oxide zirconium ($ZrO_2$), and oxide titanium ($TiO_2$), depending on the material that the metal member 11 uses among Al, Nb, Ta, Zr, and Ti.

Figure 3C:
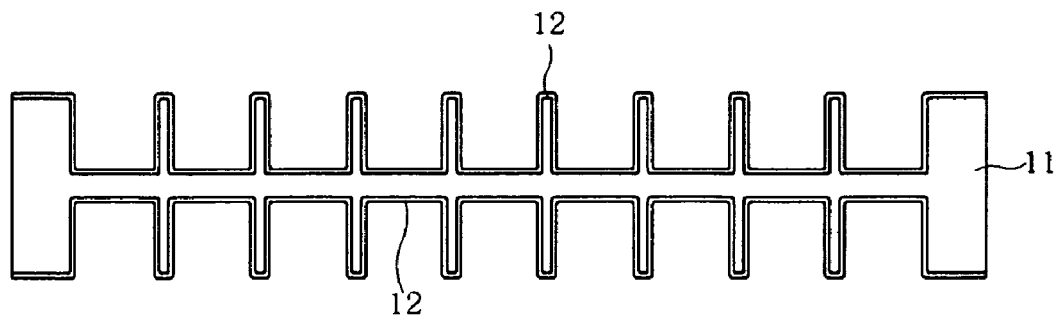

Al, Nb, Ta, and Ti using an anodizing ways is performed as shown in FIG. 3C. In this instance, the anodizing ways is performed so that a proper voltage of a capacitor may be 140% to 160% of 6.3 V to 500 V.

Figure 3D:
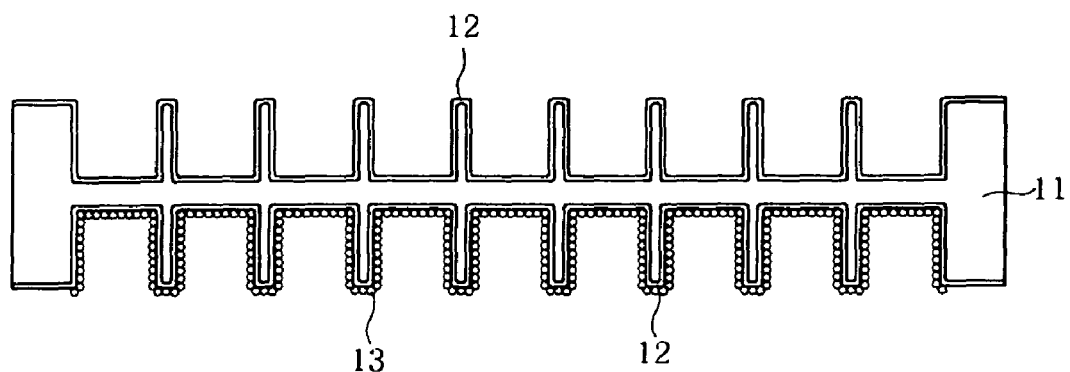
Figure 3E:
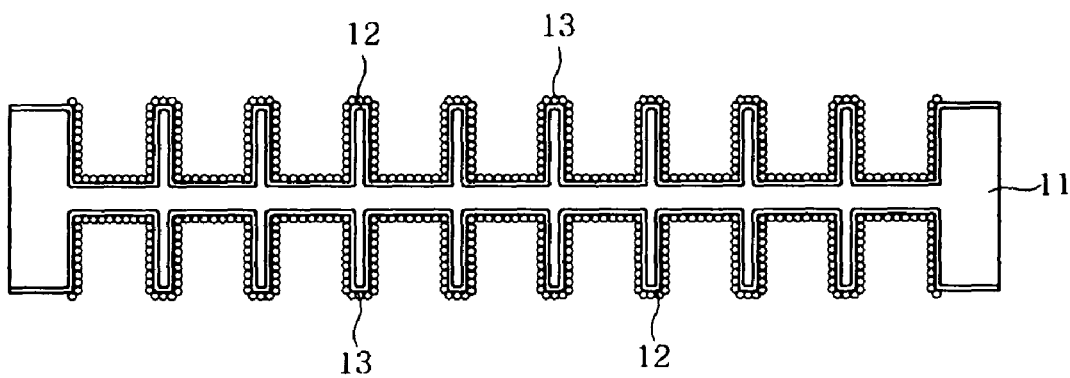

As shown in FIGS. 3D and 3E, when the metal oxide film 12 is formed, a process of forming the seed electrode layer 13 to be penetrated into the metal oxide film 12 and thereby growing by using any one of an electroless plating ways, a thermal evaporation ways, and a molecular layer growth ways is performed. The seed electrode layer 13 is formed when it is impossible to fill the main electrode layer 14 in the plurality of grooves 11a formed on the metal member 11.

Figure 3F:
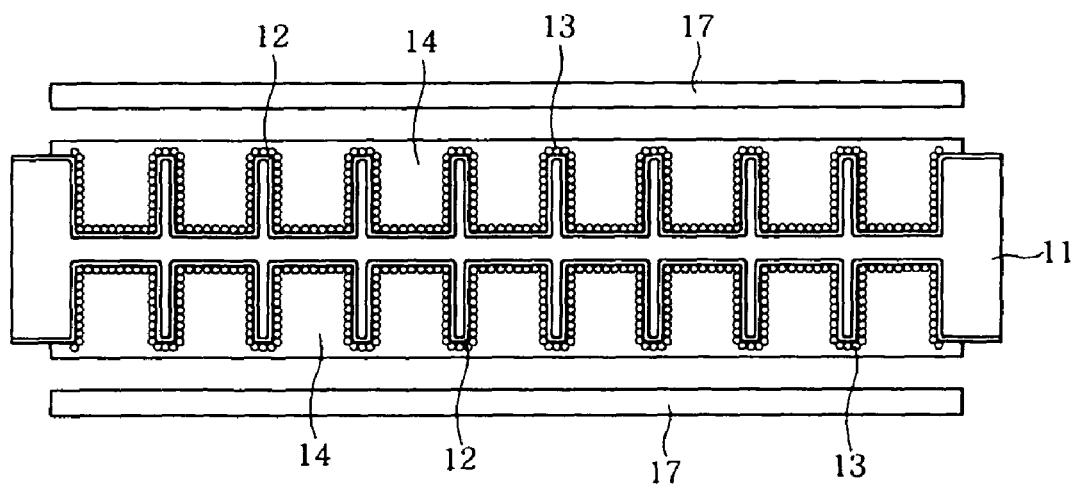

As shown in FIG. 3F, when the seed electrode layer 13 is formed, a process of forming a main electrode layer 14 to fill the plurality of grooves 11a formed on the metal member 11 via the seed electrode layer 13 as a medium by using the electroless plating ways or an electroplating ways (AC: alternative current, DC: direct current) is performed. In this instance, the seed electrode layer 13 or the main electrode layer 14 may use any one of aluminum (Al), copper (Cu), zinc (Zn), silver (Ag), gold (Au), nickel (Ni), tin (Sn), palladium (Pd), platinum (Pt), cobalt (Co), and indium (In). Also, when the main electrode layer 14 is formed in the process of forming the main electrode layer 14, a process of forming the conductive adhesive layer 17 on the main electrode layer 14 may be further performed. In this instance, the conductive adhesive layer 17 is provided to improve an adhesive strength and is formed by using a solder paste, the electroless plating ways, or the electroplating ways.

As shown in FIG. 1, when the main electrode layer 14 is formed, a process of forming the plurality of lead terminals 15 on the main electrode layer 14 is performed. Also, a molding process of sealing the metal member 11 so that the plurality of lead terminals 15 may be externally protruded is performed. Through the above process, the metal capacitor 10 is manufactured. The metal member 11 may be molded in a planar shape or a cylindrical shape in the molding process. When molding in the cylindrical shape, the metal member is molded 11 in a wound state like the conventional capacitor.

Hereinafter, a method of manufacturing the multi-layer metal capacitor 100 according to the second embodiment will be described with reference to FIGS. 3A through 3G.

In the method of manufacturing the multi-layer metal capacitor 100, an etching process of forming a plurality grooves 11a on both surfaces of a metal member 11, formed of aluminum (Al), by using a direct current (DC) etching method through a process of forming a main electrode layer 14 to fill the plurality of grooves 11a formed on the metal member 11 via the seed electrode layer 13 as a medium are the same as the manufacturing process of the metal capacitor 10 according to the first embodiment, and thus will be omitted here.

Figure 3G:
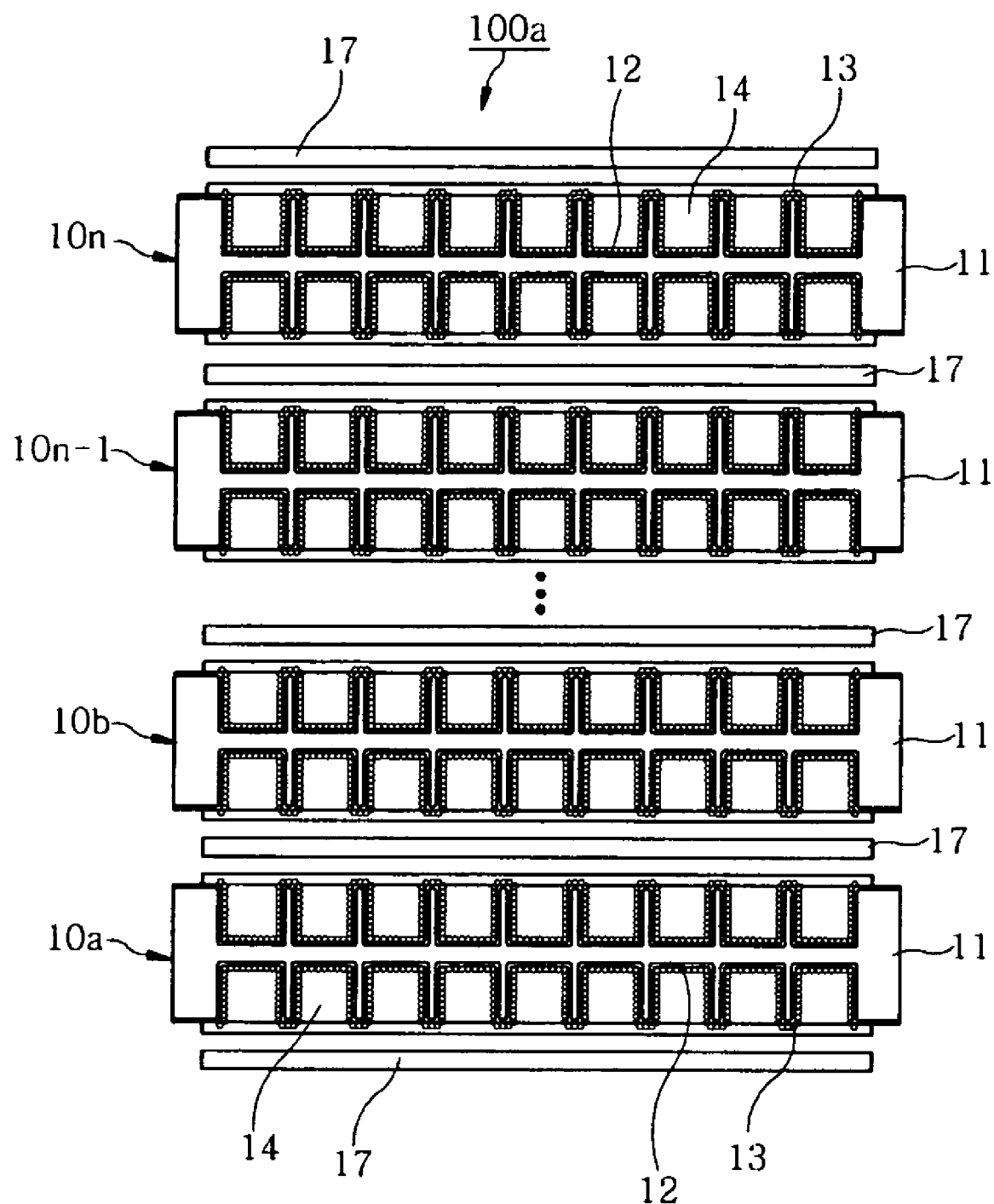

When the main electrode layer 14 is formed through the processes as shown in FIGS. 3A through 3F, a process of forming a plurality of first to $n^{th}$ metal capacitance members 10a, 10b, ..., 10n by cutting the metal member 11 formed on the main electrode layer 14 is performed. As shown in FIG. 3G, when the first to the $n^{th}$ metal capacitance members 10a, 10b, ..., 10n are formed, a process of forming a metal capacitance multi-layer body 100a by multi-laying and pressing the plurality of first to $n^{th}$ metal capacitance members 10a, 10b, ..., 10n with a high pressure is performed.

In order to more readily multi-lay the plurality of first to $n^{th}$ metal capacitance members 10a, 10b, ..., 10n, a process of forming the conductive adhesive layer 17 as shown in FIG. 3F is further performed. The process of forming the conductive adhesive layer 17 is performed to heat and multi-lay the plurality of first to $n^{th}$ metal capacitance members 10a, 10b, ..., 10n, or to more readily adhere the plurality of lead terminals 15.

When the metal capacitance multi-layer body 100a is formed, a process of forming the plurality of lead terminals 15, as shown in FIG. 2, on the main electrode layer 14, which is located on an outer portion of each of the first metal capacitance member 10a and the $n^{th}$ metal capacitance member 10n of the metal capacitance multi-layer body 100a, is performed. When forming the plurality of lead terminals 15 on the main electrode layer 14 which is located on the outer portion of the first metal capacitance member 10a and the $n^{th}$ metal capacitance member 10n, the multi-layer metal capacitor 100 is formed in the serial multi-layer shape. Therefore, it is possible to use the multi-layer metal capacitor 100 for the high-voltage and the small capacity.

When the multi-layer metal capacitor 100 is formed in the parallel multi-layer shape to use for the low-voltage and the large capacity, the plurality of lead terminals 15 is provided as indicated by dotted lines of FIG. 2. Specifically, the plurality of lead terminals 15 is connected to the main electrode layers of odd number$^{th}$ metal capacitance members, and to the main electrode layers of even number$^{th}$ metal capacitance members among the plurality of first to n$^{th}$ metal capacitance members.

When laying the plurality of first to n$^{th}$ metal capacitance members 10a, 10b, ..., 10n in either the serial or the parallel multi-layer shape, it is possible to facilitate the adhesiveness and the adhesive operation with respect to the plurality of lead terminals 15 and first to n$^{th}$ metal capacitance members 10a, 10b, ..., 10n using the conductive adhesive layer 17, which is the same as in the manufacturing method of the metal capacitor 10. The conductive adhesive layer 17 is formed using the solder paste, the electroless plating ways, or the electroplating ways. When the conductive adhesive layer 17 is provided, the plurality of first to n$^{th}$ metal capacitance members 10a, 10b, ..., 10n is provided in the multi-layer by heating. Conversely, when the conductive adhesive layer 17 is not provided, the plurality of first to n$^{th}$ metal capacitance members 10a, 10b, ..., 10n is compressed by the mechanical power with the high pressure and thereby is provided in the multi-layer.

When the plurality of first to n$^{th}$ metal capacitance members 10a, 10b, ..., 10n is multi-laid in either the serial multi-layer shape or the parallel multi-layer shape by the conductive adhesive layer 17 or the mechanical power, the molding process of sealing the metal capacitance multi-layer body 100a so that the plurality of lead terminals 15 may be externally protruded is performed. Through this, the multi-layer metal capacitor 100 is manufactured. When molding the plurality of first to n$^{th}$ metal capacitance members 10a, 10b, ..., 10n in the molding process, it is possible to mold the plurality of first to n$^{th}$ metal capacitance members 10a, 10b, ..., 10n in either the planar shape or the cylindrical shape.

The metal capacitance multi-layer body 100a may be molded using various types of ways. For example, when forming the molding member 16 in the cylindrical shape, the etching process through the process of forming the main electrode layer 14 are repeated after cutting the plurality of first to n$^{th}$ metal capacitance members 10a, 10b, ..., 10n. Through this, the metal capacitance multi-layer body 100a. Specifically, in a state where the metal member 11 is cut into the size that can be wound, the metal capacitance multi-layer body 100a is formed. When forming the molding member 16 in the planar shape, the etching process through the process of forming the main electrode layer 14 are repeated after cutting the molding member 11 into a predetermined size to form and multi-lay the plurality of first to n$^{th}$ metal capacitance members 10a, 10b, ..., 10n. Through this, the metal capacitance multi-layer 100a may be formed.

As described above, it is possible to improve an electric conductivity by about 10,000 to 1,000,000 folds by applying a metal material for an electrolyte, in comparison to when using a conventional electrolyte or an organic semiconductor. Also, since the serial multi-laying is possible, high-voltage is enabled. Also, since the polarity has no directivity, a relatively higher safety is provided. Also, it is possible to improve a thinness, a low equivalent series resistance (ESR), a reduction in a ripple pyrexia, a long life, a heat-resistant stability, non-fuming, non-firing, and environment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A metal capacitor comprising:
   a metal member including a plurality of grooves on two surfaces thereof;
   a metal oxide film being formed on the metal member; and
   a plurality of main electrode layers being formed on the metal oxide film on the two surfaces of the metal member to fill the plurality of grooves.

* * * * *